May 14, 1968  N. LASZLO  3,383,479
DEVICES FOR AUTOMATICALLY CONTROLLING THE OPERATION OF MACHINES
OR APPARATUS WHOSE FUNCTIONING FOLLOWS A PRESET PROGRAMME, AND
PARTICULARLY FOR CONTROLLING THE DEFROSTING OF REFRIGERATORS
Filed Feb. 1, 1966  3 Sheets-Sheet 1

NICOLAS LASZLO - Inventor

Hall, Pollock & Vande Sande
—Attorneys

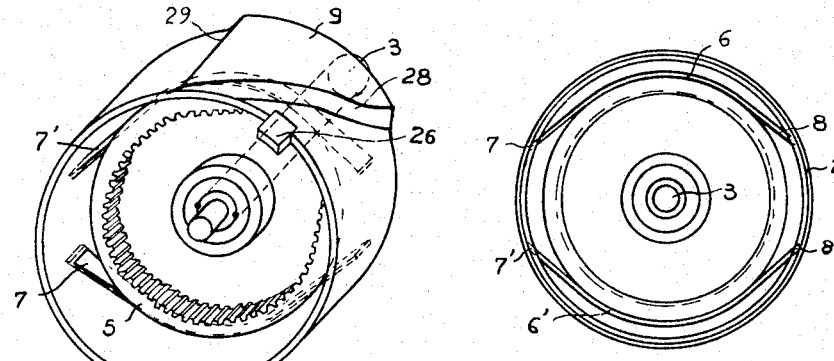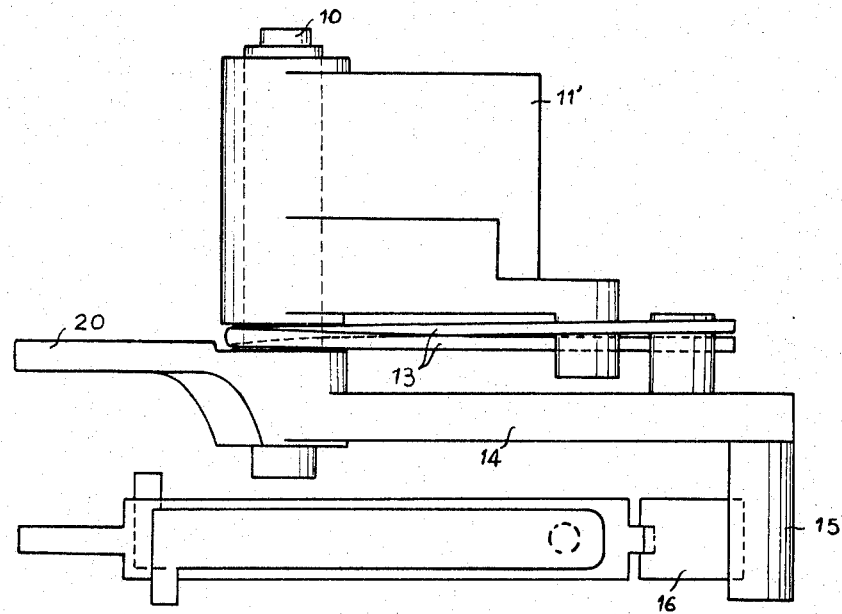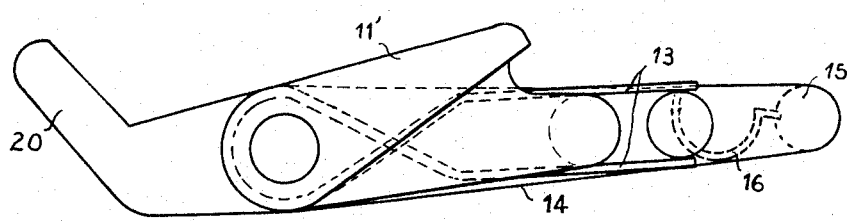

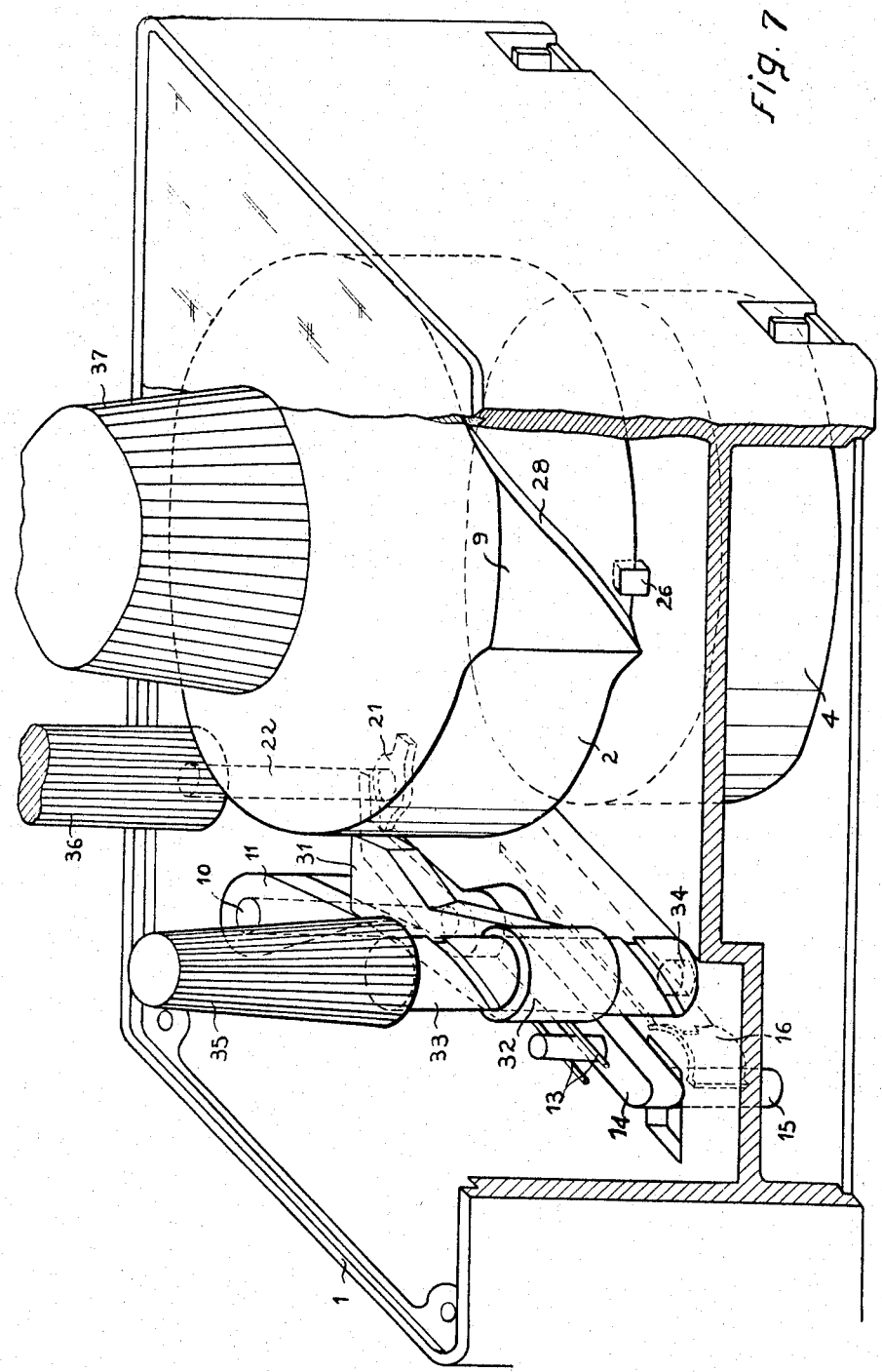

NICOLAS LASZLO - Inventor
Hall, Pollock & Vande Sande
- Attorneys 3,383,479
DEVICES FOR AUTOMATICALLY CONTROLLING
THE OPERATION OF MACHINES OR APPARA-
TUS WHOSE FUNCTIONING FOLLOWS A PRE-
SET PROGRAMME, AND PARTICULARLY FOR
CONTROLLING THE DEFROSTING OF REFRIG-
ERATORS
Nicolas Laszlo, Centre Commercial E-2,
Cluses, Haute-Savoie, France
Filed Feb. 1, 1966, Ser. No. 524,032
Claims priority, application France, Feb. 2, 1965,
4,112/62, Patent 1,431,810
3 Claims. (Cl. 200—38)

ABSTRACT OF THE DISCLOSURE

Control device for apparatus operating according to a preset program such as for example a refrigerator which uses a synchronous motor driving a cam whose angular position on the shaft of the motor can be adjusted, the cam actuating through a lever, a commutator whose contacts interrupt the electrical circuit of the apparatus to be controlled, the lever system consisting of two levers pivoted on the same shaft and connected together by a spring whereby one of the levers is actuated by the cam driven by the synchronous motor whereas the other lever actuates the commutator, for example to defrost a refrigerator. The lever which actuates the commutator has at its end opposite to that which moves the contact, a tail acted on by a blocking lever, which is itself manually operable by a control knob, in such a way that the operator can immobilise the lever actuating the commutator in order to make the latter inoperative and thus interrupt the operation, whereby when the cam pivots the second lever the pivoting movement is absorbed by the spring system connecting the two levers.

This invention relates to devices for automatically controlling machines or apparatus which function according to a preset programme, and the invention aims particularly at means for causing said machine to perform, during a periodical operating cycle, an operation whose duration and during said cycle must be adjustable, while making it possible to cancel said operation during one or more operating cycles of the machine.

The invention is particularly suitable for controlling the periodic defrosting of a refrigerator during a 24-hour cycle, for example, but the invention is also applicable to other machines or apparatus in all those cases where it is desirable to be able to cancel a periodic function, and is in particular applicable to clocks with timing contacts, to electric alarm clocks and the like. In regard to refrigerators, the invention allows the defrosting process, which in some refrigerators occurs at a predetermined fixed or adjustable instant once every 24 hours, to be interrupted in order to maintain without interruption a temperature sufficiently low to allow the preservation of those foods which would be spoiled if the temperature were to be allowed to rise in the refrigerator during a normal period of defrosting.

The device according to the invention is of the already known type comprising a synchronous motor which drives a cam whose angular position on its shaft can be adjusted, said cam actuating through a lever a commutator whose contacts interrupt the electrical circuit of the refrigerator or other mechanism to be controlled, and the device according to the invention is characterised in that the lever actuating the commutator is in two pieces and consists of two levers pivoted on the same shaft and connected together by a spring, for example a hair spring, whereby one of these levers is acted on by the cam driven by the synchronous motor, whereas the other lever actuates the commutator, for example in order to put it into the defrosting position.

The lever which actuates the commutator has at its other end, that is to say at its end opposite to that which moves the contact, a tail acted on by a blocking lever, which is itself actuated by a control knob, in such fashion that the operator can immobilize the lever actuating the commutator in order to make the latter inoperative and thus interrupt the defrosting operation, whereby when the cam pivots the second lever this movement is absorbed by the connecting spring.

The invention will be further described with reference to the accompanying drawings showing several embodiments of the invention suitable for different methods of operating a refrigerator, and in which drawings:

FIGURE 3 is an underneath plan view of the cam which actuates the commutator.

FIGURE 4 is a side elevation of the levers through which the cam actuates the commutator in a second embodiment of the invention, and FIGURE 5 is a plan view of the same.

FIGURE 6 is an underneath perspective view of the cam used in this second version, which is also represented in perspective as a partly sectioned view in FIGURE 7.

Figure 1:
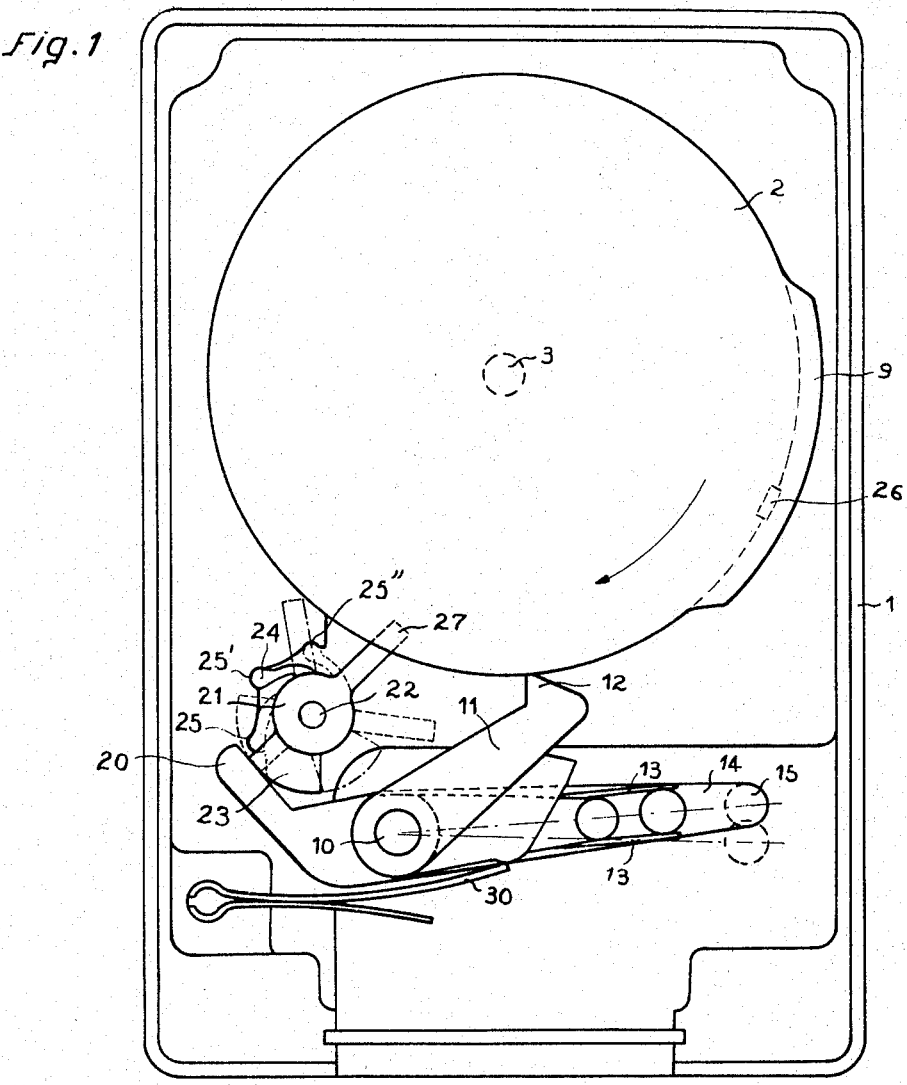
FIGURE 1 is a plan view of a first version of the apparatus.
Figure 2:
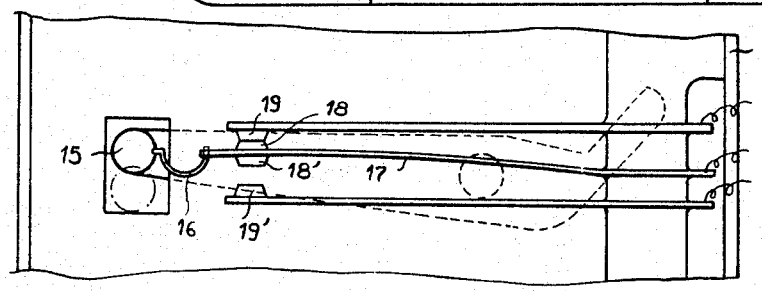
FIGURE 2 is a plan view of the commutator from underneath.

FIGURES 1 to 5 show how the device according to the invention comprises a housing 1 in which a cam 2 is mounted to rotate on a shaft 3 which is driven by a synchronous motor 4 through a reducing gear. The motor 4 is underneath the cam and can be seen in FIGURE 7. The reducing gear is designed so that the cam 2 performs one rotation in every 24 hours. The cam 2 is a hollow member mounted by friction (FIGURE 3) on an internally toothed cup 5, which is the driven element of the reduction gear. The friction is supplied by two springs 6, 6' in the form of bent strips whose middles push from either side against the outer wall of the cup 5. The ends 7, 8 and 7', 8' of the springs engage in corresponding recesses in the internal wall of the hollow cam member 2.

The cam 2 has a boss 9 (FIGURES 1 and 2) which acts on pivoted levers in turn actuating the contacts of the commutator which breaks the electric circuit of the refrigerator assembly. These levers comprise two levers pivoted on a common shaft 10. The first of these two levers, the lever 11, has a nose 12 which rests in contact with the cam 2, and this lever 12 is connected through a spring, for example, a hair spring 13, to a second lever 14 which has on its end a pin 15 actuating, through the flip-flop spring (C-spring) 16, a tongue 17 which carries the contacts 18, 18' capable of making electric contact alternatively with the fixed contacts 19, 19', one of which controls the circuit of the refrigerator while the other can if desired bring into operation during the defrosting period a heating resistance in order to speed up the process of defrosting.

The device comprises means for cancelling the defrosting during one or more 24-hour cycles. For this purpose the lever 14 has, on its end furthest from the actuating pin 15, a tail 20 which is actuated by a blocking lever 21, pivoting about a shaft 22 and has on its end nearest to the tail 20 a segment 23. This blocking lever 21 has also a resilient wing 24 at the side which acts as a locating catch in that the rounded end of the wing 24 can click in a resilient manner into the suitably shaped recesses 25, 25′, 25″ of a member which is fixed to the housing 1.

When the blocking lever 21 is in the position represented by the dot-dash lines it is held in this position by engagement of the resilient wing 24 in the notch 25 and, in these circumstances, the blocking lever 21 does not make contact with the tail 20 of the lever 14. With the blocking lever 21 in this position there is therefore no interference with the defrosting process, which is controlled in the normal way by the cam 9 rocking the lever 11, which in turn rocks the lever 14 in flexible fashion through the spring 13. On the other hand, when the blocking lever 21 has been rotated into the position shown in full lines, so that the segment 23 has one end in contact with the tail 20 of the lever 14, the latter is immobilised in such a position that the contact 18 rests against the contact 19, whereby the electric circuit of the refrigerator is closed. In these circumstances when the boss 9 of the cam 2 pivots the lever 11, the movement of this lever is absorbed by the connecting spring 13 and is not transmitted to the lever 14, which is blocked in such a position that the electric circuit of the refrigerator remains closed, with the result that defrosting does not take place.

It may now be desired that defrosting shall take place during the following 24-hour cycle, without it being necessary for the operator to return the blocking lever 21 into its neutral position, that is to say, into the position represented by the dot-dash or broken lines. For this purpose the cam 2 has in its lower edge a tripping projection 26, so positioned that with the rotation of the cam this tripping projection 26 comes into contact with the end 27 of the blocking lever 21 and returns the latter automatically into the neutral position. On the other hand, it may be desired to cancel the defrosting during several successive 24-hour cycles. To effect this the blocking lever 21 is rotated by hand into the position shown in broken lines. In these circumstances, the segment 23 blocks the lever 14, 20 in the position in which the electric circuit of the refrigerator is closed, with the result that defrosting is prevented. Moreover, when the blocking lever is in this position, as represented by the broken lines, the end 27 is not in the path of movement of the tripping extension 26 of the cam 2 and consequently the blocking lever 21 is not automatically returned to its neutral position. Finally at the end of the period during which it is desired to have no defrosting, it may be desired to return the device to normal operation. For this purpose the blocking lever 21 is rotated by hand into the neutral position.

FIGURES 6 and 7 represent a second version of the invention, and here the duration of the defrosting operation can be adjusted as desired. To provide this facility the boss 9 of the cam 2 has a rear face 28 inclined to the axis of the cam. The front face 29 of the boss 9 has an edge which runs parallel to the axis of the cam. In this version of the invention the lever 11 does not rest directly against the cam under the influence of the spring 30, as described above, but acts through an intermediate lever 31, whose thickness is less than the height of the cam 2. The position of this intermediate lever 31 can be adjusted vertically in such fashion that it is actuated by an area of the cam 9 which varies according to the adjustment made, with the result that said intermediate lever 31 is acted on by the cam during an interval of time which depends on said vertical adjustment of the position of this intermediate lever 31.

The vertical adjustment in position of the intermediate lever 31 is effected as follows. The lever 31 is mounted on a sleeve 32 which has an interior thread and is mounted on the shaft 33, which is pivoted at 34 on the housing 1. The shaft 33 has a corresponding screw thread and terminates in the control knob 35, in such fashion that when the operator rotates this control knob he causes the intermediate lever 31 to move upwards or downwards over the surface of the cam 2.

Figure 8:
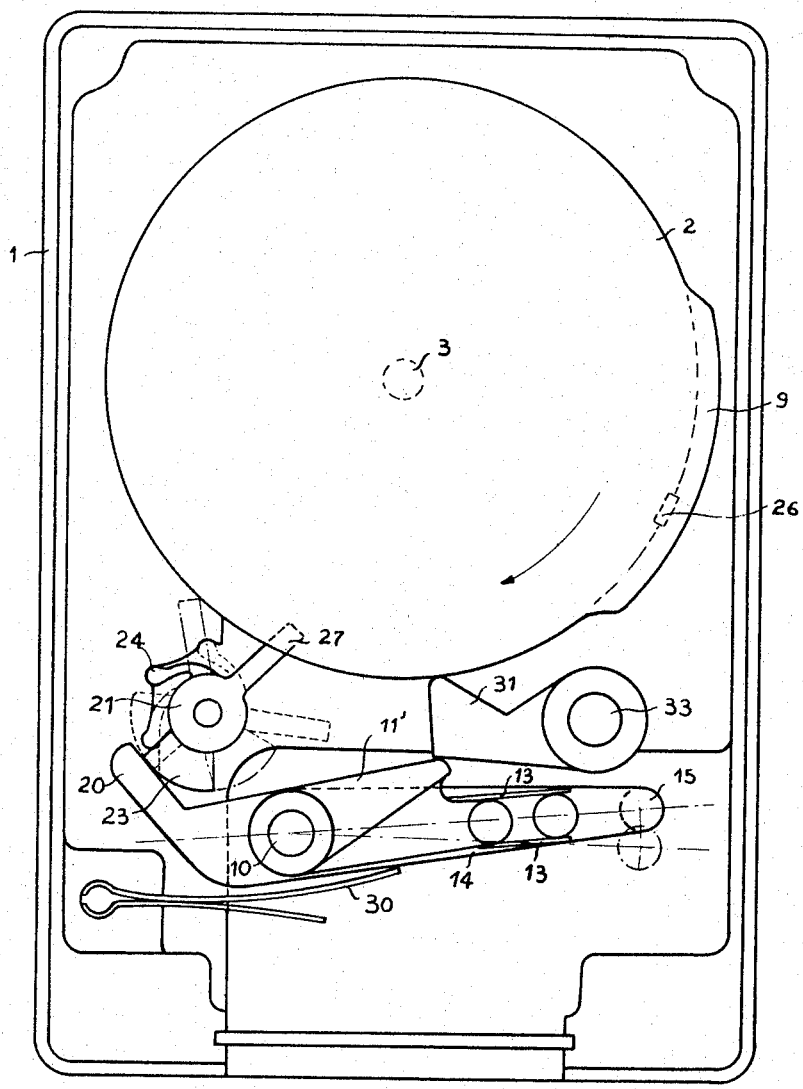
FIGURE 8 is a plan view of the device shown in FIGURE 7.

In this second manifestation of the invention the apparatus also has a blocking lever 21 which allows the operator to cancel the defrosting through one or more 24-hour cycles. This blocking lever 21 is actuated by the operator by means of the control knob 36 which is fixed to its sprindle 22. The intermediate lever 31 can be removed from the apparatus together with its actuating members, and in this way the apparatus can be converted from the embodiment of FIGURES 1 to 5 to that of FIGURES 6, 7 and 8. To effect this conversion it is merely necessary to install in the apparatus this intermediate lever 31, together with its actuating members, and to install in place of the lever 11 the other lever 11′, which has no nose 12. In both versions of the invention the cam has a control knob 37 allowing adjustment of the position of rotation of the cam relative to that of the internally toothed cup 5. In this way the operator can adjust the apparatus to begin defrosting at any time desired. In the case of a domestic refrigerator for example the defrosting is usually done at night, whereas in the case of a large refrigerator it is preferably to have the defrosting take place at a time when the apparatus can be observed.

Figure 9:
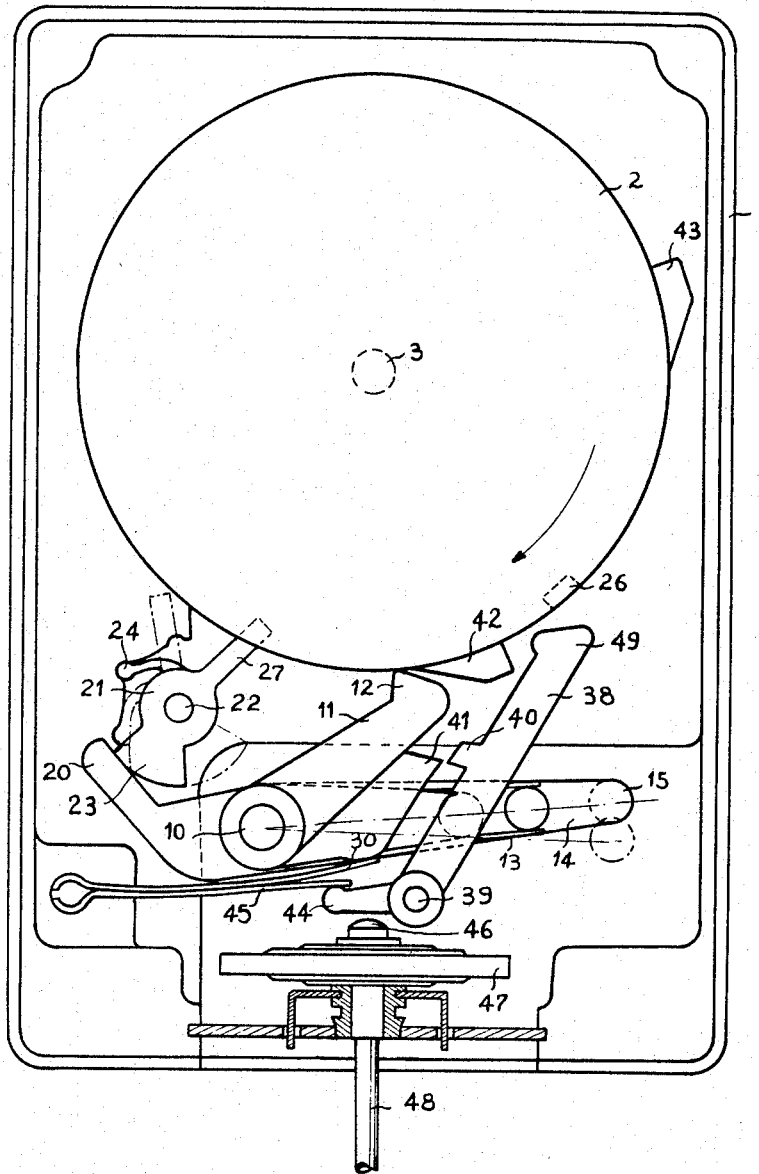
FIGURE 9 is a plan view of a third version in which the starting up of the refrigerator after defrosting is effected by a thermostat.

FIGURE 9 shows a version of the invention in which the cancelling of defrosting and the return of the circuit to normal refrigeration are controlled by a thermostat. For this purpose the apparatus comprises an extra lever 38 pivoted at 39.

The lever 38 has projecting from its inner face a claw 40 which acts in conjunction with the nose 41 of the base of the lever 12. In this case the lever 12 rests directly against the cam 2, as it does in the version of FIGURE 1. The cam 2 has two bosses 42, 43 angularly spaced apart from each other, whereby the first boss actuates the lever 12 to begin the defrosting, as described for the first version of the invention, whereas the second is used for a safety movement which will be described below.

This extra lever 38 has on its end away from the cam an angled foot 44 which is urged by the spring 45 to rest against the thrust button 46 of the thermostatic capsule 47, to which is attached the tube 48 penetrating through the wall of the housing 1 into the interior of the refrigerator. The arrangement functions as follows. When the boss 42 of the cam 2 pivots the lever 12, this movement is transmitted by the spring 13 to the lever 14 of the commutator, and this stops the operation of the refrigerator assembly and starts the defrosting operation. At the same time the nose 41, which is firmly fixed to the lever 12, engages with the catch 40 of the auxiliary lever 38. In these circumstances the levers 12 and 14 are locked in the defrosting position. The length of the boss 42 is just enough to ensure the pivoting movements of these levers.

The apparatus is now locked in the defrosting position. When the defrosting has been completed, as shown by the fact that the interior of the refrigerator has warmed up to a certain temperature, the thermostatic capsule 47 expands, just at this time, in such fashion that the thrust button 46 of the capsule pushes against the foot 44 of the lever 38, pivoting the latter towards the right, about its axle 39, and thus disengaging the nose 41 of the lever 12, whereupon the leaf spring 30 pivots the levers 12 and 14 back into their initial positions, whereby the commutator closes the refrigerator circuit and thus starts the refrigerating operation. In the event that for some reason or other the thermostat has not started up the refrigerator in this way by the time the boss 43 reaches its operative position, this boss 43 actuates the nose 49 of the lever 38, pivoting this lever towards the right and so unlocking the lever 12, with the result that the refrigerator assembly is started up as described above.

In this version, as in the one previously described, there can be a blocking lever 21 which acts on the end 20 of the lever 14 to allow the commutator to cancel defrosting during one or more 24-hour cycles.

What is claimed is:

1. Control device for apparatus operating according to a preset program, said apparatus having means whereby the apparatus is made to perform a cycle of operations and means whereby said performance is interrupted for a preselected number of cycles, means for adjusting the duration of said operations and for adjusting each of said operations and for adjusting starting of one of said operations of said cycle, said control device comprising in combination:

(A) a synchronous motor;
(B) a shaft driven by said motor;
(C) angularly adjustable cam means on said shaft;
(D) a commutator having contacts adapted to control the said operation;
(E) lever means comprising two levers pivoted on a common shaft, spring means elastically coupling said levers, one of said levers being actuated by said cam means, the other of said levers controlling said contacts of said commutator and a tail at its other end; a pivoted manually operable lever adapted to engage said tail of said second lever to prevent said second lever from actuating said commutator when said first lever is actuated by said cam means, whereby said operation does not take place and when said cam actuates said second lever by a pivoting movement, said movement is absorbed by said spring means.

2. Control device according to claim 1, wherein said cam means comprise a cam having a boss for actuating said first lever and a tripping projection arranged on the lower edge of said cam and angularly positioned behind said boss in the direction of rotation of said cam, said tripping projection being adapted to engage said blocking lever, whereby said lever controlling said commutator is released and the said operation is allowed to take place during the next revolution of said cam.

3. Device according to claim 2, wherein said blocking lever is so arranged as to assume a position in which it engages said tail of said lever actuating said commutator to prevent said operation but in which said blocking lever is not positioned in the path of said tripping projection of said cam, whereby said operation is interrupted until said blocking lever is returned to a neutral position.

References Cited

UNITED STATES PATENTS

| | | | |
|---|---|---|---|
| 2,687,620 | 8/1954 | Raney | 62—155 XR |
| 2,690,526 | 9/1954 | Morrison | 62—155 XR |
| 2,792,691 | 5/1957 | Murphy | 62—155 |
| 2,949,017 | 8/1960 | Swanson | 200—38 |
| 2,975,612 | 3/1961 | Everard | 62—155 |
| 3,089,926 | 5/1963 | Everard | 200—38 |
| 3,107,281 | 10/1963 | Tufts | 200—38 |

MEYER PERLIN, *Primary Examiner.*